Sept. 22, 1942.　　　　E. BLOCK　　　　2,296,494
MANUFACTURE OF ANHYDROUS DI-CALCIUM PHOSPHATE
Filed Sept. 14, 1939
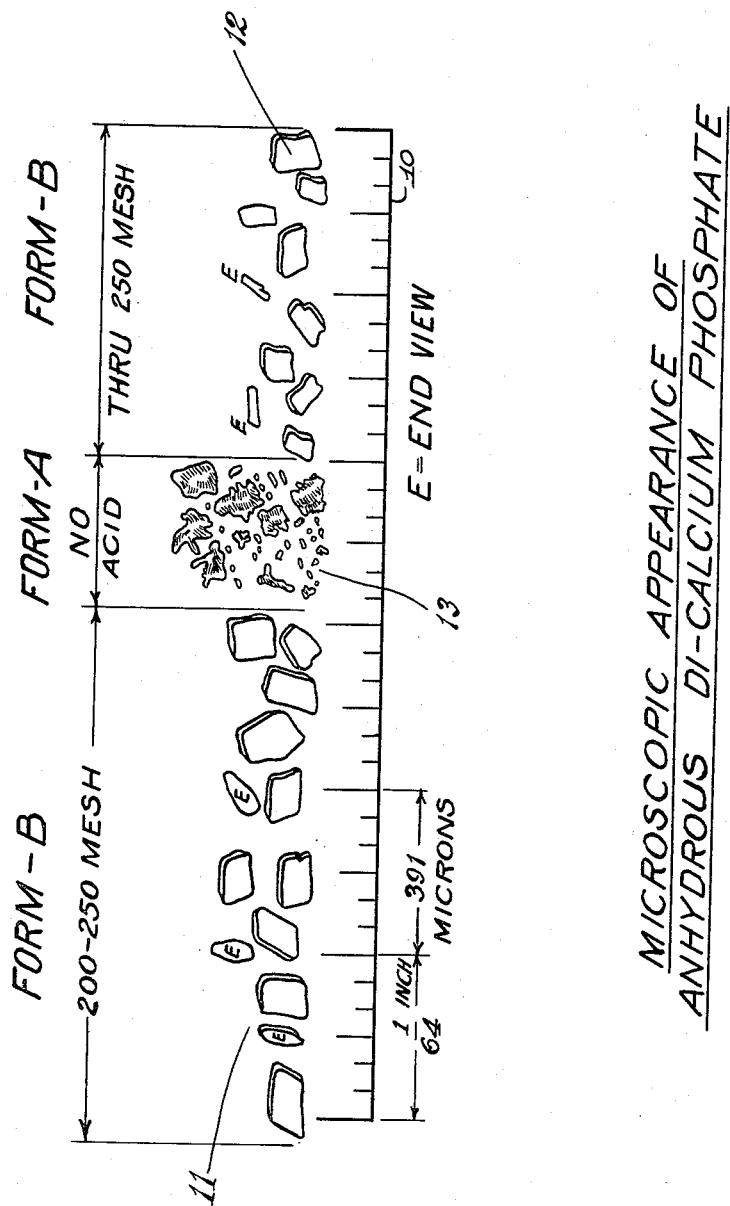
Inventor
Edward Block
by W. Bartlett Jones.
Attorney Patented Sept. 22, 1942

2,296,494

UNITED STATES PATENT OFFICE 2,296,494

MANUFACTURE OF ANHYDROUS DI-CALCIUM PHOSPHATE

Edward Block, Joliet, Ill., assignor to Blockson Chemical Co., Joliet, Ill., a corporation of Illinois Application September 14, 1939, Serial No. 294,825

9 Claims. (Cl. 23—109)

The present invention relates to the manufacture of di-calcium phosphate anhydrate.

There is a demand for a mono-calcium phosphate anhydrate as a substitute for the same salt as the monohydrate. In baking powders, self-rising flour, and other prepared flour-base compositions for pancakes, waffles, doughnuts, cakes and the like, an anhydrous form is preferred. It has a slower rate of reaction upon the bicarbonate of sodium, so that a better product is obtained. Difficulties have been encountered heretofore in making an anhydrous form having such qualities at a cost permitting competition with the monohydrate form. New processes for its manufacture have long been sought. In experimenting with a new process which has been developed and is herein described, for making anhydrous mono-calcium phosphate, I have discovered that one of the factors of the product, namely, anhydrous di-calcium phosphate, must have special physical characteristics in order for said process to operate. I have found that some forms yield mono-calcium phosphate monohydrate, and that other forms yield mono-calcium phosphate anhydrate. I have also discovered that the chemical forms of the two classes of such factor are identical, as indicated by their X-ray spectra. I have also discovered how the operable forms may be produced. Because the same procedure produces different products according to the physical type of the anhydrous di-calcium phosphate employed, I have also a new process for making anhydrous mono-calcium phosphate.

The present invention has for its objects, the production of anhydrous mono-calcium phosphate, and the production of anhydrous di-calcium phosphate for use in the production of the said anhydrous mono-calcium phosphate.

Other objects of the invention are the provision of a simple process utilizing commercially concentrated phosphoric acid for the direct production of anhydrous mono-calcium phosphate, and the provision of a form of anhydrous di-calcium phosphate which is reactive with such phosphoric acid for such purpose.

Various other and ancillary objects and advantages of the invention will become apparent from the following description and explanation given merely to illustrate the nature of the invention, and not in limitation thereof.

I have discovered that a strong phosphoric acid solution in water and di-calcium phosphate anhydrate may be reacted under controlled conditions to produce a mono-calcium phosphate which is either the anhydrate or the monohydrate according to the physical character of the di-calcium phosphate anhydrate. It is known that the monohydrate may be readily secured, but so far as I am aware it is not known that the anhydrate may be secured. Numerous factors are involved. Stated generally, there is a temperature factor, such that mere increase in temperature causes the anhydrate to be formed from materials which at lower temperature will form the monohydrate. Another factor is the form of the di-calcium phosphate anhydrate. With respect to this factor, it may be said that one form (A) will give the hydrated product under the very conditions which cause another form (B) to produce the anhydrous product.

Herein the designation "A" refers broadly to inoperable forms, and the designation "B" refers broadly to operable forms. The present description contemplates definition of limits characterizing form "B".

Therefore, in order to explain the reaction it must be shown that there is a difference in form, and it must be described what form of di-calcium phosphate anhydrate is required. This is done first by teaching how a single raw material may be treated to produce either the form A or B above referred to.

In order to illustrate the nature of the invention I give first a description of a form of di-calcium phosphate dihydrate having the formula $CaHPO_4.2H_2O$, which may be used to produce form A or form B.

Table 1 gives the chemical analysis of the said material dried at 50° C. Table 2 gives the probable composition, making useful the information of Table 1. Table 3 gives the particle size distribution and apparent density as the best indication of physical size. Following this is other information pertinent to identity.

TABLE 1.—*Chemical analysis*

| | Per cent |
|---|---|
| CaO | 31.5 |
| $P_2O_5$ | 40.9 |
| $Na_2O$ | 0.65 |
| $Al_2O_3$ | 0.15 |
| $Fe_2O_3$ | 0.03 |
| $SO_3$ | 0.21 |
| $H_2O$ (at 900° C.) | 26.43 |
| | 99.87 |

TABLE 2.—*Probable composition*

| | Per cent |
|---|---|
| Di-calcium phosphate dihydrate $CaHPO_4.2H_2O$ | 96.6 |
| Disodium phosphate $Na_2HPO_4$ | 1.48 |
| Aluminum phosphate $AlPO_4$ | 0.36 |
| Iron phosphate $FePO_4$ | 0.06 |
| Calcium sulphate $CaSO_4.2H_2O$ | 0.45 |
| Water, free or combined | 0.92 |
| | 99.87 |

TABLE 3.—*Screen analysis*

| | Per cent |
|---|---|
| Larger than 140 mesh | 7 |
| 140 to 200 mesh | 19 |
| 200 to 250 mesh | 26 |
| Smaller than 250 mesh | 48 |

Apparent density, 42 lbs. per cu. ft.

Microscopic examination shows each particle to be composed of a myriad of very small crystals of di-calcium phosphate dihydrate cemented together to form an irregularly shaped particle. The X-ray pattern corresponds to that attributed to di-calcium phosphate dihydrate.

34% free water, referred to herein as the wet base.

In a vessel of 2-liter capacity, equipped for mechanical agitation, 800 grams of the said wet base is mixed to a uniform slurry with an equal weight of water, and made slightly acid with 2 cc. of 85% phosphoric acid. The flask is heated gradually and at a constant rate, the latter being done to give the following observations the explanatory significance attached to them. The course of the reaction has been timed, the pH observed, the liquid phase analyzed, and the solid phase analyzed, with results given below in Table 4.

TABLE 4
*Observations on operation of preferred procedure*

| Minutes time of heating | Temperature, degrees C. | pH of solution | Liquid Phase | | | | Solid Phase | | Apparent density air dried |
|---|---|---|---|---|---|---|---|---|---|
| | | | Grams $Na_2O$ 100 cc. | Grams CaO 100 cc. | Grams $P_2O_5$ 100 cc. | Percent $Na_4O$ released | Air dried percent $P_2O_5$ | Dried at 105° C. percent $P_2O_5$ | |
| 0 | Before acid | 7.62 | | | | | | | 42 |
| 0 | After acid | 5.55 | | | | | | | |
| 0 | 24 | | | | | | | | |
| 11 | 45 | | | | | | | | |
| 20 | 60 | | | | | | | | |
| 30 | 75 | 6.15 | | | | | | | |
| 45 | 95 | 6.00 | .044 | Trace | .102 | 13.5 | 40.8 | 44.4 | 42 |
| 55 | 100.5 | 4.93 | .090 | Trace | .213 | 27.7 | 40.8 | 45.1 | 42 |
| 65 | 100.5 | 4.03 | .113 | .02 | .309 | 34.8 | 41.5 | 46.3 | 42 |
| 72 | 99.5 | 3.61 | .195 | .06 | .590 | 60.0 | 42.4 | 47.7 | 42 |
| 75 | 99 | | | | | | | | |
| 77 | 98 | | | | | | | | |
| 78 | 97 | | | | | | | | |
| 79 | 96 | | | | | | | | |
| 80 | 95 | | | | | | | | |
| 81 | 94.5 | | | | | | | | |
| 83 | 94.0 | | | | | | | | |
| 84 | 94.5 | | | | | | | | |
| 85 | 95 | 3.10 | .241 | .09 | .792 | 74.1 | 50.5 | 50.5 | 73 |
| 86 | 96 | | | | | | | | |
| 87 | 97 | | | | | | | | |
| 88 | 98 | | | | | | | | |
| 90 | 99 | | | | | | | | |
| 93 | 100.5 | | | | | | | | |
| 123 | 100.5 | 2.91 | .265 | .03 | .703 | 81.5 | 50.4 | 50.3 | 75 |

The material above described may be made as described in Block and Metziger U. S. Patent No. 2,078,627, which yields directly a wet mass of the product.

It is known that a water suspension of di-calcium phosphate dihydrate may be converted to anhydrous form in water by heating the suspension. The change takes place at about 70° C. The form so produced is not suitable for the present invention. In accordance with the present invention, I may carry the treatment further to produce either a form A, which is light and fluffy, or a form B, which is heavy.

*Production of form A*

A water suspension containing 20% by weight of di-calcium phosphate dihydrate is heated to 85° C., omitting a trace of acid, such as about 1% phosphoric acid, which is used as described later, to make form B. The product will have changed to the anhydrous form. If this heating is continued quickly to 95° C. a light fluffy form A is obtainable on filtering and drying. The particles appear to shatter into smaller fragments giving a low density product. The acidity is a controlling factor. For example, if the acid is added after reaching 85° C., the crystals still shatter into a light fluffy product.

*Production of form B*

Di-calcium phosphate dihydrate of the form described above either wet or dry may be used. As produced according to said Patent No. 2,078,627, it may have 66% dihydrate solids, and The final product form B air-dried has a chemical analysis as in Table 5, a probable composition as in Table 6, and a particle size distribution and apparent density as in Table 7.

TABLE 5.—*Form B—Chemical analysis*

| | Per cent |
|---|---|
| CaO | 39.4 |
| $P_2O_5$ | 50.3 |
| $Na_2O$ | 0.15 |
| $Al_2O_3$ | Trace |
| $Fe_2O_3$ | Trace |
| $SO_3$ | 0.25 |
| $H_2O$ (at 900° C.) | 8.95 |
| | 99.05 |

TABLE 6.—*Form B—Probable composition*

| | Per cent |
|---|---|
| Di-calcium phosphate anhydrous $CaHPO_4$ | 96.3 |
| Disodium phosphate $Na_2HPO_4$ | 0.35 |
| Calcium sulfate $CaSO_4.2H_2O$ | .55 |
| Water, free or combined | 1.85 |
| | 99.05 |

TABLE 7.—*Form B—Screen analysis*

| | Per cent |
|---|---|
| Larger than 140 mesh | 5.0 |
| 140 to 200 mesh | 16.6 |
| 200 to 250 mesh | 33.4 |
| Smaller than 250 mesh | 45.0 |

Apparent density, 75 pounds per cubic foot

Microscopic examination and measurement show well formed flat translucent crystals of oblique parallelopiped form. The majority of the individual crystals fall within the measurements as follows:

Small size—40 x 65 x 15 microns
Large size—90 x 130 x 30 microns

Larger particles than above appear to be the result of several crystals sticking together. There are practically no crystals smaller than the above lower limit. The X-ray pattern is that attributed to anhydrous di-calcium phosphate, from which it is concluded that the crystal system is the usual one, and not new, although the specific form and the sizes of such forms appear to be new.

Discussion of Table 4

The results of Table 4 have been chosen to explain the invention, by specially operating the process at those conditions which experience dictates are the preferred ones. Variations are permitted, as will be explained, and of course the character of the data in Table 4 will be different.

The amount of acid present is sufficient to give the solution a pH of about 2, but this is not indicated at the start. However, as the process goes on, the pH is lowered, approaching pH of 2. There is no indication of chemical reaction utilizing the acid.

Because the wet base employed has crystals which are agglomerates, it is believed that these crystals absorb or adsorb the said acid. It also is shown that sodium, calcium and $F_2O_5$ increase in the liquid phase indicating the release of the probable di-sodium phosphate as the base material changes to more consolidated integral anhydrous form. The analyses indicate a decrease in disodium phosphate content. Also, iron and aluminum impurities of the base pass into the liquid phase.

Following the time and temperature relation, and noting the regular rate of heating (and also of radiation to lose heat) the temperature is an indication of transition in the base. It is noted that in from 65 to 72 minutes a maximum temperature is reached, that a cooling then occurs, and a heating follows. The endothermic change occurs at 94° C., which is a point quite regularly observed in many experiments to be the transition temperature. If heating is very slow, a visible transition begins when the temperature of 94° C. is attained. Visible changes occur as this cooling goes on, and when at 85 minutes the temperature rises again, it is found in Table 4 that the solid phase has changed. The apparent density in particular has changed from 42 to 73 pounds per cu. ft. In other words, the base has become dehydrated and consolidated. It has not definitely been ascertained whether the dehydration and consolidation are simultaneous effects, in the specific illustration, but in other cases it has been demonstrated that the same final product can result from treatment effecting dehydration, followed by consolidation. It is concluded that the process of dehydration, even in an aqueous suspension, absorbs heat from the liquid, resulting in the cooling.

From the knowledge of the structure of the base and of the final dense product of dehydration, it appears that the original particle-form agglomerated minute crystals of di-calcium phosphate dihydrate are transformed each particle into a single unitary crystal of anhydrous di-calcium phosphate with release of impurities in the agglomerate-particle. Where the agglomerate-particle is initially large it appears to result in the formation of two or more integral crystals united or cemented together. Where there are very small agglomerate-particles it appears that in transformation there is a tendency for them to attach to and become integral with other crystals in their growth. Microscopic examinations made at the 72-minute period show particles which are part agglomerate, like the base, and part integral crystal, like the final product.

There is a leveling process as to particle size, tending to produce crystals within a quite definite range of particle size. Both the smaller and the larger particles in transition form larger and smaller particles. This is demonstrated by dividing the base into graded sizes, and repeating the process (as in Table 4) with the graded sizes. Then the products are graded. So doing this, the following is found:

TABLE 8

*Transition size change*

| Grade of base | Grade of product | | |
|---|---|---|---|
| | 100 to 200 mesh | 200 to 250 mesh | Finer than 250 mesh |
| | Percent | Percent | Percent |
| 100 to 200 mesh | 42 | 22 | 32 |
| 200 to 250 mesh | 10 | 46 | 46 |
| Finer than 250 mesh | 8 | 10 | 84 |

Within the limits tested it may be said that as the particles are smaller more of them remain the same size, more of them become coarser, and less of them become smaller. The net effect of the above is to indicate that the agglomerate-particles of the base do not shatter and form smaller crystals during the transition process. Rather they tend to maintain their particle integrity, and even show growth or union.

Modified procedure

A water suspension containing 20% by weight of the agglomerate-particles of di-calcium phosphate dihydrate and a trace of acid, such as about 1% phosphoric acid, is heated to 85° C. The mass is heated slowly to 90° C. over a half hour period. Then the mass is heated much slower to 96° C., by increasing the temperature one degree per half hour. The product filtered and dried is a granular dense anhydrous di-calcium phosphate of form B, with an apparent density of 60 lbs. per cu. ft., 95% to 98% passing a 200 mesh screen. In the process there is no visible change up to 94° C., but there a visible change begins, which is completed in the temperature range from 95° C. to 96° C. This change does not take place if the heating is too fast.

Variations

The last procedure represents the manufacture of a form B having a density of 60 lbs. compared to 73 to 75 lbs. per cu. ft. of the preferred procedure. Other variations of the process are permitted. These may result in inefficiency, waste and lowered yield. The percentage of the solids in the slurry is not critical, and the amount of acid used is not critical. Increase of acid will not stop the formation of form B, but excess of it solubilizes calcium phosphates into the liquid phase, and increases the tendency of the crystals to attach to each other. The rate of heating is not critical, and it may be slow or rapid, but it must be sufficiently prolonged to secure the dense crystals as already shown. It is sufficient to heat only to 94° C. and to maintain that temperature. This temperature appears to be the critical one for the consolidation. However, it appears that where dehydration occurs first, followed by consolidation, the apparent density is less than where these processes seem to occur together. Numerous variations of the process will produce a form B varying from 50 to 78 lbs. per cu. ft. However, where the acid was omitted, the di-sodium phosphate did not release from the solid phase, and the product consisted of form A, showing irregularly shaped particles, less than about 13 microns in size, having an apparent density of 40 lbs. per cu. ft. The agglomerate-particles of the base appear to have shattered before or during dehydration, and not to have consolidated.

The acid added need not be limited to phosphoric acid, and may be hydrochloric, nitric or sulphuric or other strong acid. However, these introduce impurity and eventually liberate phosphoric acid, so practically, phosphoric acid is added, as it will otherwise be formed.

In the accompanying drawing there is shown a scale 10 with inches and microns marked, against which there are shown three types of crystals. The left hand group of crystals 11 are form B crystals of 200 to 250 mesh screen. Those marked E show the appearance of crystals endwise, indicating their flat shape. The facial views indicate the parallelopiped form, and are of size in the micron range of 65 x 100 x 25 to 90 x 130 x 30. The right-hand group of crystals 12 are similar, but show those passing a 250 mesh wire, and are of size in the micron range of 40 x 65 x 15 to 65 x 100 x 25. The middle group of crystals 13 represents the form A of anhydrous di-calcium phosphate produced without acid as described above. They are generally less than 13 microns, and of apparent density of about 40 lbs. per cu. ft.

The use of form B

The process comprises generally the quick mixing of concentrated phosphoric acid solution in water and granular form B of di-calcium phosphate anhydrate, having an apparent density of 50 lbs. or more per cu. ft. The particle size distribution of the latter is not of critical significance. The temperatures of the two reactants should be such that upon mixing, the reaction mass will have a temperature sufficiently high to produce the anhydrous product, thus avoiding those lower temperatures which will otherwise produce the monohydrate.

The concentration of the acid may vary from 75% to 90%, but preferably 80% is used. This strength is readily obtained by open pan evaporation of water from weaker solutions, the final boiling point being near 140° C. This acid is commonly handled in ordinary equipment which resists corrosion. Stronger acids are more difficult to obtain by open evaporation, because as the boiling temperature increases, some of the acid is converted to pyrophosphoric acid. However, these may be used, forming pyrophosphate impurities in the product. Concentrations lower than 80% are more difficult to use, requiring greater control and care, the need for which begins quite sharply at 78% strength.

Determination of the exact critical temperature below which the hydrate is formed, and above which the anhydrate is formed is difficult. This is in part due to the fact that upon mixing, the temperature increases because of generated heat. There is also a cooling effect when the steam begins to be released. The amount of water in the mass after mixing seems to play some part in shifting the critical temperature. By using a Dewar flask as a reaction vessel which conserves heat, and using the ingredients of the following Example 1, the critical temperature seems to be in the range from 130° C. to 135° C.

In carrying out the invention practically any phosphoric acid may be used which can be heated to at least the critical temperature, as 130° C. to 135° C. The form B di-calcium phosphate anhydrate is then heated at least to the critical temperature, where the said acid is practically at the critical temperature, thus to assure the mixture not falling below the critical temperature.

The mechanism of the reaction itself readily indicates its progress and whether or not the temperature is high enough. Where the reaction succeeds there is a period of fluidity, which is very short, on the order of 30 seconds, during which the reactants may be uniformly mixed. Then the material as quickly goes through a plastic stage and sets to a dry crumbly mass. The plasticity appears to be the result of crystal formation and is attended with the liberation of steam in visible quantity. Where the reaction to form anhydrate does not proceed, as with form A, or with too low temperatures using form B, there is no period of fluidity, no plastic stage, and no comparable liberation of steam. Rather, there is a simple wetting and quick setting to a dry crumbly hydrated product.

The temperature at which the desired reaction takes place is well over 100° C., and is produced by the initial heating of the ingredients and the heat of reaction. Some heat is lost in the steam. It appears as though the solid and the liquid either mix, or react differently, in those cases where the desired product is obtained, compared to the cases where it is not obtained. In carrying out the process with a solution of 80% phosphoric acid, the latter may be heated to its boiling point of near 140° C., and the form B may be heated to 150° C. The 20% water in the acid is not readily boiled away at 140° C. After quickly mixing, when the fluid stage is reached, there is no appreciable liberation of water at the resulting high temperature, indicating that no reaction has occurred, such as to loosen the water from the acid. But as soon as the final reaction product begins to form, the di-calcium phosphate anhydrate takes up chemically only the phosphoric acid without the water being permanently involved in the reaction, thus releasing the water previously held by the acid, to be lost as steam.

Excess of acid

The reaction empirically is the addition of one mole of orthophosphoric acid to one mole of di-calcium phosphate anhydrate. When the above described reaction is carried out with equal molecular parts of the reacting ingredients, the fluidity may be such that the mixing may not be completed within the fluid period. This depends upon skill or mechanical equipment. The fluidity may be increased by using an excess of acid. The characteristic setting and liberation of steam still obtain. The temperature of the reaction mass is such as to evaporate any residual mixture of acid and water to a suitable concentration for using the excess acid in the same reaction. The excess acid permeates the crumbly product. The excess acid may be neutralized with an amount of the form B corresponding to it for the same reaction. This may be added before the initial product cools, or after it is cold. The materials are well mixed and heated to an elevated temperature, such at 150° C. Under these conditions the excess acid and the form B react to form more of the mono-calcium phosphate anhydrate.

In carrying out the reaction in large quantities the reaction temperature will be raised by heat of reaction more than occurs in a small mass. The beginning of reaction may be such as to form the hydrated product, and then the heat of reaction raises it to form the anhydrous product. It is obviously preferable to have the temperature initially high enough to form the anhydrous product at the beginning, and to provide for the escape of heat. Explosive release of steam should be avoided, and this may be done by carrying out the process in pan-type mixers providing relatively large area for depth.

Example 1

One mole of form B (di-calcium phosphate anhydrate) and 1¼ moles of 80% phosphoric acid are heated separately to 150° C. and 140° C. respectively. They are quickly mixed. A period of fluidity permitting thorough mixing obtains for about 30 seconds. Then a thickening takes place about as quickly with a liberation of steam, resulting in a dry granular set mass. The excess acid in the product may be extracted with solvents for phosphoric acid which do not affect the mono-calcium phosphate anhydrate, such as acetone, or alcohols, ethyl acetate, and the like. However, this procedure may be avoided by a second stage of the same reaction. The product produced as above is ground and thoroughly mixed with ¼ mole of form B and the mixture heated to 150° C. which assures passing the critical temperature. Then the product is ground. It consists of 95% or more of mono-calcium phosphate anhydrate in granular, non-hygroscopic form.

Example 2

One mole of form B (di-calcium phosphate anhydrate) at 150° C. and one mole of 78% phosphoric acid heated to near its boiling point are quickly and well mixed. A fluid stage quickly passes into a plastic stage and then to a setting stage, with liberation of steam. The product is merely ground and is largely mono-calcium phosphate anhydrate.

The product

The product used in self-rising flour with sodium bicarbonate exhibits the desired retarded action. In fact it has proven slower than other commercial forms of mono-calcium phosphate anhydrate used for the same purpose. The product may be of different crystal form, or of greater purity, thus accounting for the apparent improvement in comparative tests.

The presence of pyrophosphate in the product is of course a contamination. The concentrated phosphoric acid employed may contain increasing amounts of pyrophosphoric acid where the concentration is much over 80% phosphoric acid equivalent, and 20% water (by weight) produced by atmospheric boiling down of phosphoric acid. The term "phosphoric acid" as used herein signifies the ortho variety of the formula $H_3PO_4$. By using a concentrated phosphoric acid near 80%, the same may be produced economically without providing any substantial contamination by pyrophosphoric acid. It is not intended to convey the idea that all phosphoric acid solutions over 80% are contaminated with phyrophosphoric acid. That occurs only where the solution has been obtained by use of temperatures higher than that which will produce an 80% solution by open evaporation at normal atmospheric pressure. However, we prefer not to use such higher strength acids, as they call for use of more expensive corrosion-resistant equipment than use of the said 80% strength acid.

The invention is subject to numerous changes and modifications, and is not to be construed as limited by or to the examples herein given specifically to illustrate the nature of the invention and the preferred manner of carrying it out. Accordingly, the accompanying claims express the invention in both its generic and specific aspects, including such changes and modifications as will naturally occur to those skilled in the art.

This application is a continuation in part of my prior application Serial No. 266,546, filed April 7, 1939, and is related to my copending, cofiled application Serial No. 294,826, in which is claimed the production of mono-calcium phosphate anhydrate as described herein.

I claim:

1. The method of making anhydrous di-calcium phosphate, which comprises heating particle forms having agglomerated minute crystals of di-calcium phosphate dihydrate in acidified water to a temperature of at least 94° C., whereby in attaining said temperature a dehydration to di-calcium phosphate anhydrate has occurred, and maintaining a temperature of at least 94° C. for a prolonged period of time, wherein the crystal form of the di-calcium phosphate anhydrate attains a condition characterized by integral flat crystals of parallelopiped form having when dry an apparent density of at least 50 lbs. per cu. ft.

2. The method of making anhydrous di-calcium phosphate, which comprises heating particle forms having agglomerated minute crystals of di-calcium phosphate dihydrate in acidified water to a temperature of at least 94° C., whereby in attaining said temperature a dehydration to di-calcium phosphate anhydrate has occurred, and maintaining a temperature of at least 94° C. for a prolonged period of time, wherein the crystal form of the di-calcium phosphate anhydrate attains a condition characterized by integral flat crystals of parallelopiped form which predominate in sizes between a crystal of 40 x 65 x 15 microns and a crystal of 90 x 130 x 30 microns.

3. The method of making anhydrous di-calcium phosphate, which comprises heating particle forms having agglomerated minute crystals of di-calcium phosphate dihydrate in about a 1% solution of phosphoric acid in water to a temperature of at least 94° C., whereby in attaining said temperature a dehydration to di-calcium phosphate anhydrate has occurred, and maintaining a temperature of at least 94° C. for a prolonged period of time, wherein the crystal form of the di-calcium phosphate anhydrate attains a condition characterized by integral flat crystals of parallelopiped form having when dry an apparent density of at least 50 lbs. per cu. ft.

4. The method of making anhydrous di-calcium phosphate, which comprises heating particle forms having agglomerated minute crystals of di-calcium phosphate dihydrate in about a 1% solution of phosphoric acid in water to a temperature of at least 94° C., whereby in attaining said temperature a dehydration to di-calcium phosphate anhydrate has occurred, and maintaining a temperature of at least 94° C. for a prolonged period of time, wherein the crystal form of the di-calcium phosphate anhydrate attains a condition characterized by integral flat crystals of parallelopiped form which predominate in sizes between a crystal of 40 x 65 x 15 microns and a crystal of 90 x 130 x 30 microns.

5. Di-calcium phosphate anhydrate in the form of flat integral parallelopiped crystals, having in the aggregate an apparent density of at least 50 lbs. per cu. ft.

6. Di-calcium phosphate anhydrate in the form of flat integral parallelopiped crystals, predominating in sizes between a crystal of 40 x 65 x 15 microns and a crystal of 90 x 130 x 30 microns.

7. The method of making anhydrous di-calcium phosphate which comprises heating particle forms having agglomerated minute crystals of di-calcium phosphate dihydrate having when dry an apparent density of about 42 lbs. per cu. ft. in about a 1% solution of phosphoric acid in water to at least 94° C., whereby in attaining said temperature a dehydration to di-calcium phosphate anhydrate has occurred, and maintaining a temperature of at least 94° C. for a prolonged period of time, wherein the crystal form of the di-calcium phosphate anhydrate attains a condition characterized by integral flat crystals of parallelopiped form having when dry an apparent density of at least 50 lbs. per cu. ft.

8. The method of making anhydrous di-calcium phosphate which comprises heating about 1 part by weight of particle forms of di-calcium phosphate dihydrate having when dry an apparent density of about 42 lbs. per cu. ft. and about 2 parts by weight of water in the presence of about .02 part by weight of phosphoric acid, to from 94° C. to 100° C. for from 40 to 80 minutes after reaching 94° C., whereby there are formed integral flat parallelopiped crystals of anhydrous di-calcium phosphate characterized by an apparent density when dry of over 50 lbs. per cu. ft.

9. The method of making anhydrous di-calcium phosphate which comprises heating di-calcium phosphate dihydrate particles having when dry an apparent density of about 42 lbs. per cu. ft. in acidified water to a temperature of at least 94° C., whereby in attaining said temperature a dehydration to di-calcium phosphate anhydrate has occurred, and maintaining a temperature of at least 94° C. for a prolonged period of time, wherein the crystal form of the di-calcium phosphate anhydrate attains a condition cnaracterized by a denser form having when dry an apparent density of at least 50 lbs. per cu. ft.

EDWARD BLOCK.

CERTIFICATE OF CORRECTION.

Patent No. 2,296,494.  September 22, 1942.

EDWARD BLOCK.

It is hereby certified that error appears in the printed specification of the above numbered patent requiring correction as follows: Page 2, Table 4, in the heading to column 7 thereof, for "Percent Na$_4$O released" read --Percent Na$_2$O released--; page 3, second column, lines 31 to 33, Table 8, last column thereof, for "32", "46", and "84" read --36--, --44--, and --82--; and that the said Letters Patent should be read with this correction therein that the same may conform to the record of the case in the Patent Office.

Signed and sealed this 27th day of October, A. D. 1942.

Henry Van Arsdale,
Acting Commissioner of Patents.

(Seal)